(12) United States Patent
Volz et al.

(10) Patent No.: US 6,283,558 B1
(45) Date of Patent: Sep. 4, 2001

(54) HYDRAULIC MOTOR VEHICLE BRAKING SYSTEM WITH WHEEL SLIP CONTROLLER

(75) Inventors: Peter Volz, Darmstadt; Ronald Kley, Seligenstadt; Guido Angenendt, Frankfurt am Main, all of (DE)

(73) Assignee: Continental Teves AG & Co. OHG, Frankfurt (DE)

( * ) Notice: Subject to any disclaimer, the term of this patent is extended or adjusted under 35 U.S.C. 154(b) by 0 days.

(21) Appl. No.: 09/382,062

(22) Filed: Aug. 24, 1999

(30) Foreign Application Priority Data

| Aug. 25, 1998 | (DE) | 198 38 613 |
| Aug. 25, 1998 | (DE) | 198 38 608 |
| Apr. 22, 1999 | (DE) | 199 18 112 |

(51) Int. Cl.[7] .................................................. B60T 8/34
(52) U.S. Cl. ...................................... 303/113.1; 303/155
(58) Field of Search ............................. 303/113.1, 113.4, 303/155, 114.3, 116.1, 116.2, 116.11

(56) References Cited

U.S. PATENT DOCUMENTS

| 4,703,978 | * | 11/1987 | Belart et al. ............................. 303/52 |
| 4,783,125 | * | 11/1988 | Belart et al. ............................. 303/92 |
| 4,793,663 | * | 12/1988 | Ocvirk et al. ........................ 303/110 |
| 5,350,226 | * | 9/1994 | Burgdorf et al. ................. 303/116.2 |
| 5,918,948 | * | 7/1999 | Burgdorf et al. ................. 303/113.2 |

* cited by examiner

Primary Examiner—Robert J. Oberleitner
Assistant Examiner—Xuan Lan Nguyen
(74) Attorney, Agent, or Firm—Rader, Fishman & Grauer PLLC

(57) ABSTRACT

Hydraulic motor vehicle braking system with wheel slip controller, comprising a brake pressure applicator (8), which consists of a pedal-activated vacuum brake booster (18) and a main brake cylinder (19) and is connected via a brake line (14) to at least one pair of wheel brakes (2, 3), and a pump (1) connected to the brake line (14) for conveying pressure agent from the brake pressure applicator (8) in the direction of the wheel brakes (2, 3) during wheel slip control, and at least one pressure modulation valve (16, 16') installed downstream in the brake line (14) to vary the brake pressure in the wheel brakes (2, 3) during the wheel slip control process. Maximum vacuum brake force amplification is limited to a mean wheel braking pressure that represents normal braking without wheel slippage; when this representative mean value is exceeded the vacuum brake force amplification is supplemented by hydraulic amplification of wheel braking pressure as a result of activation of the pump (1), which is configured to a level of pressure that is proportionate to pedal force.

14 Claims, 3 Drawing Sheets

HYDRAULIC MOTOR VEHICLE BRAKING SYSTEM WITH WHEEL SLIP CONTROLLER

The invention relates to a hydraulic motor vehicle braking system with wheel slip controller according to the generic portion of patent claim 1.

DE 196 139 03 A1 already disclosed a motor vehicle braking system which exhibits a pedal-activated, brake pressure applicator consisting of a vacuum brake booster and a main brake cylinder, and is connected to several wheel brakes by means of suitable brake line connections. In addition, the hydraulic motor vehicle braking system includes a pump that is also connected to the brake lines in order to supply the wheel brakes with a pressure agent for purposes of controlling wheel slippage. Suitable pressure modulation valves are allocated to the wheel brakes to control wheel slippage. The vacuum brake booster should be as large as possible to ensure that it provides the greatest possible servo-assisted effect, as well as to be able to achieve, with a relatively small vacuum, suitably high levels of brake pressure while maintaining short pressure build-up times in the main cylinder during both normal braking operation without wheel slippage and operation involving activation of the anti-lock braking system and vehicle dynamics control system.

This type of system may be disadvantageous for the braking system in general, due to the fact that the vacuum being generated is frequently insufficient and/or a limited amount of space is available for installation of the vacuum brake booster.

Therefore, the objective of this invention is to use the simplest possible, cost-efficient, and well-functioning means to improve upon a hydraulic motor vehicle braking system of the type described initially so that, regardless of the size of the vacuum and the amount of space in the vehicle available for installation of the braking system, the simplest possible, small-scale brake booster can be achieved without the need to accept a limited servo-assisted effect, thus ensuring that all pressure control functions within the braking system remain unchanged.

According to the invention, this objective is solved for a hydraulic motor vehicle braking system of the type described initially by applying the characterizing features of patent claim 1.

Additional features, advantages, and possible applications of the invention are explained below on the basis of the subclaims and the description of a number of prototypes depicted in FIGS. 1 to 4.

Figure 1:
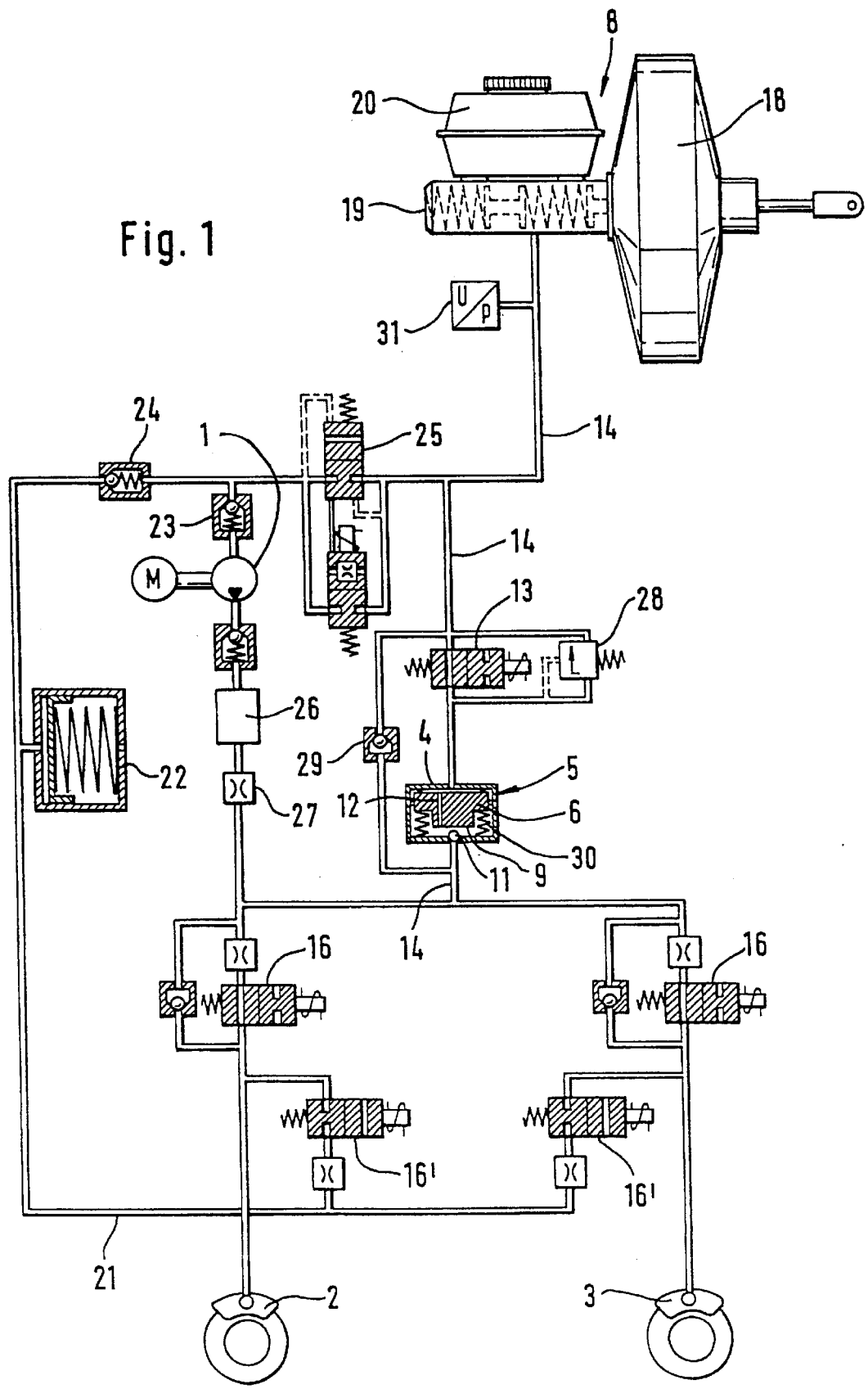
FIG. 1 depicts the hydraulic circuit diagram for a motor vehicle braking system equipped with a drive slippage, brake slippage, and vehicle dynamic control system.

FIG. 1 provides a schematic depiction of an hydraulic motor vehicle braking system consisting of a brake pressure applicator 8 which, in turn, consists of a vacuum brake booster 18 and a main brake cylinder 19 connected to a supply tank 20. For purposes of simplification, the figure depicts only one braking circuit, which corresponds to a single connection to an operating chamber of the main brake cylinder 19 and, as a brake line 14, establishes an hydraulic connection to a pair of wheel brakes 2, 3. In this brake line 14, currentless open and currentless closed pressure modulation valves 16, 16' are installed upstream from the wheel brakes 2, 3 which are preferably designed as 2/2-port directional control valves and are electromagnetically activated as inlet and outlet valves. The pressure modulation valve 16', which is currentless closed when in its normal position, is followed by a return line 21 that leads to the suction end of a pump 1. In order to be able to temporarily store volume flowing in the direction of the return line 21 when required by the wheel brakes 2, 3, a low-pressure storage device 22, which accepts the pressure agent for the wheel brakes 2, 3 when the otherwise closed pressure modulation valves 16' are opened, is positioned in a bifurcation of the return line 21. A pressure retention valve 24, which can only be opened in the direction of the pump suction path, is positioned between a pump suction valve 23 and the connection point between the low-pressure storage device 22 and the return line 21. Furthermore, a pressure agent connection connected to the brake line 14, into which an electromagnetically activated reversing valve 25 designed as a so-called two-stage valve is inserted, is positioned between the pressure retention valve 24 and the pump suction valve 23. Normally, there is no pressure agent connection between the brake pressure applicator 8 and the suction end of the pump 1 via the brake line 14 when the reversing valve 25 is in its basic position. A muffling chamber 26 known in the art is upstream from an aperture 27 on the pressure side of the pump 1; the pressure side of the pump is connected to the brake line 14 upstream from the pressure modulation valves 16, which are opened in the their normal position. A so-called piston subassembly 5 is positioned in the brake line 14 upstream from the pressure modulation valves 16, which are designed as inlet valves, and downstream from the aperture 27. In addition, a block valve 13 set to allow unobstructed flow when in its basic position is positioned between the piston subassembly 5 and the brake pressure applicator 8. This block valve is magnetically activated and generally fulfills the function of an pressure relief valve, which is symbolically depicted as a pressure limiting valve 28 connected in parallel to the block valve 13. To allow for bypassing of the block valve 13 and the piston subassembly 5 located upstream from it, a check valve 29 that opens in the direction of the wheel brakes 2, 3 is installed in a line that bypasses the brake line 14.

Figure 4:
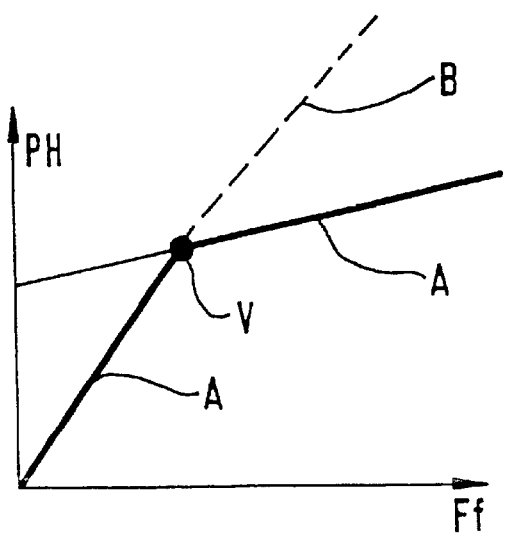
FIG. 4 depicts a diagram to explain the amplification of braking force provided by the vacuum brake booster and pump.

The proposed braking system is designed in such a way that, even when drift pressure is significantly reduced as a result of a reduced vacuum in the vacuum brake booster, or even without regard to the size of the vacuum, a miniaturized vacuum brake booster ensures that the vacuum brake booster can provide sufficient servo effect for most normal vehicle braking operations. On the other hand, the proposed braking system is capable of performing anti-lock braking, drive slippage, and vehicle dynamics control procedures, all of which are known in the art. According to the invention, this is achieved in that an hydraulic booster supplements the vacuum booster for those braking procedures which extend beyond properly dosed normal braking procedures and require maximum vehicle braking, so that when a representative mean value of required wheel braking pressure levels is already exceeded during normal braking without wheel slippage, activation of the pump 1 provides an hydraulic booster effect which generates pressure proportionate to pedal force in the direction of the wheel brakes 2, 3, so that, as depicted in FIG. 4, the drift pressure and, consequently, the drift point V of the vacuum brake booster can be exceeded accordingly. The pedal force proportionate control of pressure of the piston pump 1 acting as an hydraulic amplifier can be advantageously achieved with the piston subassembly 5, which is installed in a casing 4 of the braking system and is impinged on by the pump 1. In this illustrative example, this piston subassembly has a differential piston 6 whose large face 7 is exposed to the pressure of the brake pressure applicator 8 and whose small face 9 is exposed to both the pressure of the pump 1 and the wheel braking pressure.

Figure 2:
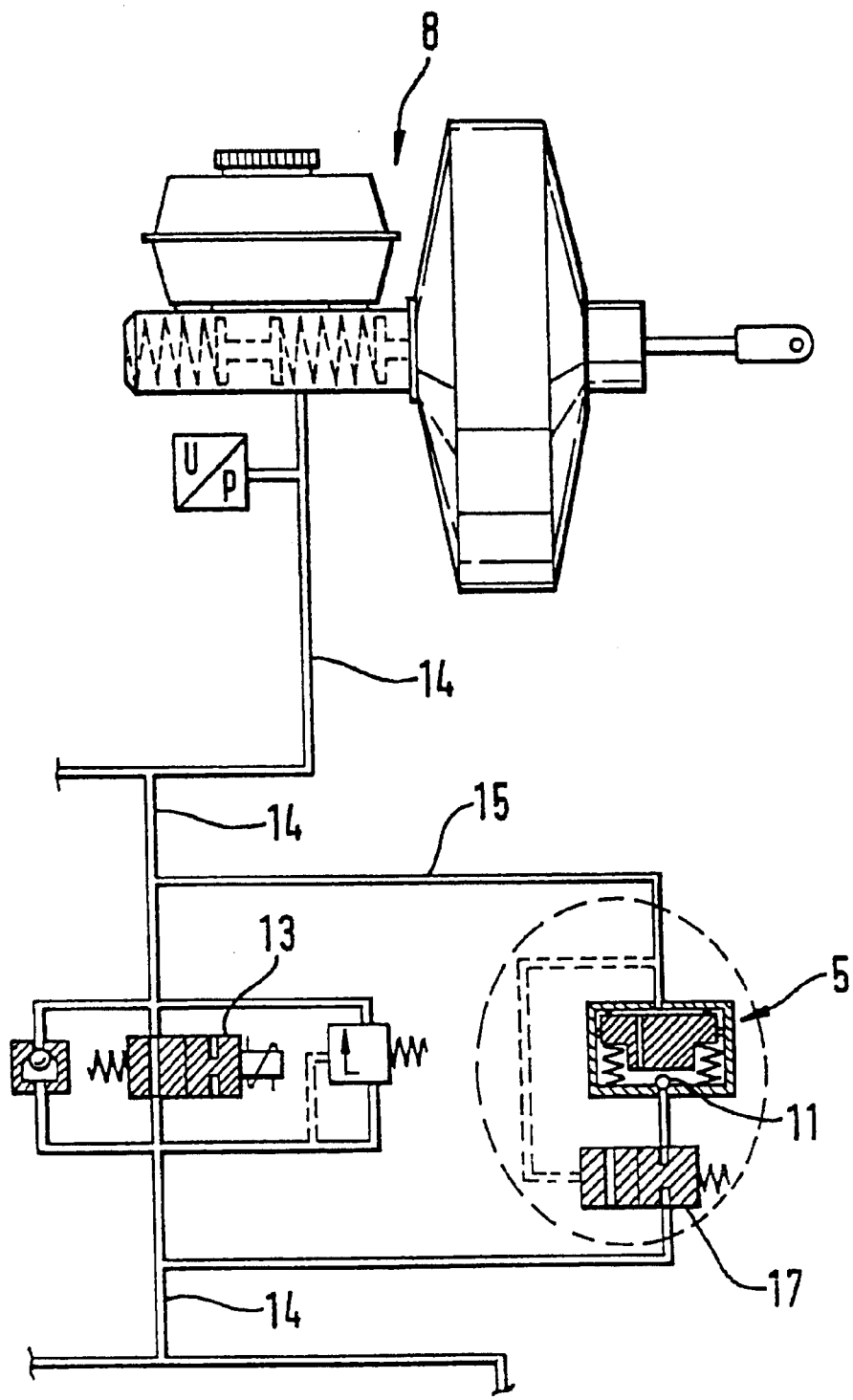
FIG. 2 depicts a section of an alternative valve arrangement for the motor vehicle braking system depicted schematically in FIG. 1.

The hydraulic braking system depicted in FIG. 2 differs from the extensively described braking system depicted in FIG. 1 in terms of the arrangement of the piston subassembly 5 in a bypass path 15 to the block valve 13, which is connected to the brake line 14. In addition, a 2/2-port directional control valve 17, which is also arranged in parallel to the block valve 13, is provided in the hydraulic connection between the pump 1 and the piston subassembly 5. According to the figure, this valve 17 is located in the brake line 15 underneath the piston subassembly 5. This 2/2-port directional control valve 17 is depicted, in its basic position, as a closed hydraulic valve which can be switched in response to pressure from the brake pressure applicator to allow for unobstructed flow, and which, while in its open position, allows the pressure agent from the pump 1 to reach the valve subassembly 5. Though not depicted in the figure, the 2/2-port directional control valve 17 can also be electromagnetically activated as an alternative to hydraulic activation. To achieve this, it must be designed as a directional control valve which is configured for unobstructed flow in its basic position, and which, in response to electromagnetic stimulation, interrupts the pressure agent connection in the direction of the piston subassembly 5. Refer to FIG. 1 for the continuation of the pressure agent connections not depicted in FIG. 2.

If we compare the executions depicted in FIGS. 1 and 2, it becomes apparent that the execution depicted in FIG. 1 represents the lowest amount of hydraulic expenditure in terms of the arrangement of the piston subassembly 5. In contrast, according to the circuit layout partially depicted in FIG. 2, the 2/2-port directional control valve is needed in this case—due to the arrangement of the piston subassembly 5 in parallel to the brake line 14 and/or to the block valve 13, the 2/2-port directional control valve—to allow for drive slippage control without allowing pressure agent to escape in the direction of the brake pressure applicator 8.

However, this does not disclose all alternatives for depicting the proposed braking system. These alternatives also include, for example, the option of connecting the one control pressure connection of the pressure limiting valve 28, which is arranged in parallel to the block valve 13, to the brake line 14. However, due to the resulting direct draw on pump operating pressure, this can lead to a valve switching noise and possibly to unwanted structural changes to the pressure limiting valve 28. Thus, given the relatively low opening pressure and the resulting minimal noise level and small size of the valve, the means of connecting the pressure limiting valve 28 depicted in FIG. 1 is optimal.

The operation of the principle features of the braking system according to the invention will be explained below using the depiction in FIG. 1. When the brake pressure applicator 8 is actuated, the pedal force generated by this action is initially amplified via the vacuum brake booster in a manner known in the art. During this process, hydraulic pressure accumulates in the main brake cylinder 19; this pressure is transferred to the wheel brakes 2, 3 through the check valve 29 and, in parallel, through the open block valve 13 and the pressure agent connection 12 in the piston unit 5, as well as through the opened pressure modulation valve 16. If the braking procedure is a slip-free normal braking procedure with small to moderate braking delays, the servo effect that can be achieved with the small vacuum booster 18 is sufficient. However, if the drift point of the vacuum brake booster 18 that represents the servo effect has already been reached (as a result of the imminent need for maximum braking action) and, consequently, the vacuum brake booster 18 is unable to provide additional servo support, the reversing valve 25 is switched to its open position and the pump 1 is activated. In this operating state, the differential piston 6 remains unchanged in its upper terminal position, as the readjusting spring 30 acting on the differential piston 6 is configured so that the differential piston 6 does not act on the valve closing element 11 in this braking pressure range. The pump 1 sucks fluid from the brake pressure applicator 8 and generates a stream that moves the check valve 29 positioned in parallel to the differential piston 6 into its locked position. As long as the pedal force is not increased to a level substantially greater than the drift point of the vacuum brake booster 18, the opened valve closing element 11 will allow the stream from the pump to flow unobstructed through the pressure agent connection 12 inserted into the differential piston 6 and back in the direction of the brake pressure applicator 8. However, if pedal force is increased, the differential piston 6 assumes the function of a pressure limiting valve that is essentially controlled by the advance pressure emanating from the brake pressure applicator 8; the structure and operation of this pressure limiting valve are explained below on the basis of FIG. 3.

To achieve a favorable response from the braking system when the pedal is actuated quickly, and in light of the pressure buildup gradient generated by the pump 1, the pump 1 must be driven at full pump capacity. When pressure is applied to the brake pedal in suitable doses and when pressure is maintained for suitable periods of time, a reduction in pump capacity is recommended for reasons of comfort. This is achieved by driving the electric motor of the pump 1 by means of a speed controller or cycling device. Suction throttling to reduce pump action can be achieved by clocking the reversing valve 25. The information on the pedal pressure generated by the driver, as well as on the speed with which the driver steps onto the pedal, can be analyzed in a manner known in the art by means of electronic equipment and a sensor system which is not depicted in detail in the invention. To this end, a pressure sensor 21 is provided on the brake line 14 near the main brake cylinder 19 in the prototype being discussed here. The use of a path sensor on the brake pressure applicator 8 for this purpose is also conceivable.

The mode of operation of the device depicted in FIG. 2 varies from that of the device depicted in FIG. 2 in that when the pedal is actuated the pressure introduced into the brake line 14 automatically opens the 2/2-port directional control valve 17 in the bypass line, so that when the 2/2-port directional control valve 17 is in its open position the differential piston 6 continues to operate in the same as it would operate in the braking system depicted in FIG. 1.

Figure 3:
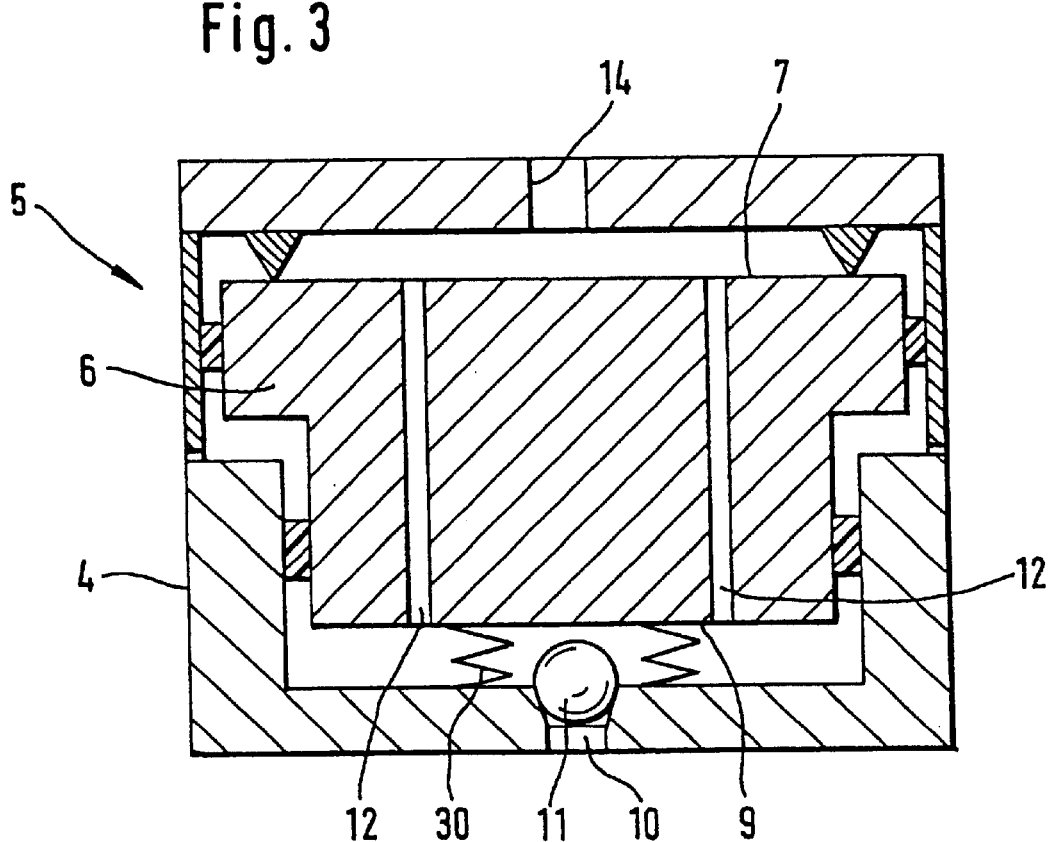
FIG. 3 depicts a design for a proposed solution to realize the piston subassembly depicted symbolically in FIGS. 1 and 2.

As a supplement to the discussion of FIGS. 1 and 2, the design and the mode of operation of the piston subassembly 5 shall be explained in detail below on the basis of FIG. 3. The piston subassembly 5 has an axially moveable differential piston 6 in a casing 4. The large face 7 of the differential piston 6 is subjected to the hydraulic pressure of the brake pressure applicator 8, while the opposing, smaller face 9 is subjected to both the pressure of the pump 1 and the wheel braking pressure. A valve closing element 11, which is provided in the casing 4 between the small face 9 of the differential piston 6 and a pressure agent supply 10 leading to the pump 1 and the wheel brakes 2, 3, rests against the pressure agent supply 10 when the brake is not actuated and can rise from its valve seat without obstruction when the brake is actuated, as a readjusting spring 30 adjacent to the smaller face 9 allows the differential piston 6 to pause on a catch on the casing side when it is not touching the valve closing element 11. Clearance channels are worked into the differential pistons 6. These channels, referred to and described above as a so-called pressure agent connection 12, allow for an unobstructed connection between the pressure agent supply 10 and the opposing brake line 14 leading to the brake pressure applicator 8 when the valve closing element 11 is in its open position. The proposed arrangement of the readjusting spring 30 represents only one of the options for basic positioning of the differential piston 6 on the catch on the casing side. Alternatively, the readjusting spring 30 could be positioned between the piston level and the casing level. In the same light, the positioning of the channels in the pressure agent connection 12 described above represents only one of several possibilities, while the means of sealing the piston in the casing 4 is at the individual user's discretion. Thus, the operation of the piston subassembly 5 is based upon the principle that both faces of the differential piston 6 are subject to the same hydraulic pressure from the brake pressure applicator 8 via the integrated pressure agent connections 12. The difference in surface area between the two faces results in an operating force that presses against the valve seat at the pressure agent supply 10, acting in opposition to the elastic force of the valve closing element 11. This, in turn, directly affects the opening pressure of the valve closing element 11. This elastic force must be configured in such a way that the smaller face 9 of the differential piston 6 rests against the spherical valve closing element 11 in the drift point of the vacuum brake booster, thus allowing the hydraulic action that begins when the pump 1 starts running to take effect. Thus, once the drift point is reached, a system pressure comprising the main cylinder pressure and the difference in pressure between the main cylinder pressure and the drift pressure acts in the direction of the wheel brakes 2, 3. This difference in pressure is multiplied by the hydraulic amplification factor which, depending on the elastic force in the drift point, comprises the difference between the surface area of both faces and the valve seat area of the valve closing element 11. Thus, using the pump 1 in combination with the vacuum brake booster 18, it is essentially possible to adjust the servo effect for any wheel brake 2, 3 so that it is both comfortable and proportionate to a given amount of foot pressure.

FIG. 4 convincingly illustrates the amplification properties on which the invention is based. When viewed in isolation, characteristic c curve A in the figure depicts the change in main cylinder pressure PH effected by the vacuum brake booster 18 as a factor of pedal force Ff, while the dashed characteristic curve B illustrates the substantial increase in main cylinder pressure that occurs when the drift point V is exceeded in the vacuum brake booster 18. Until this drift point V is attained, an initially steep linear relationship exists between the pedal force Ff plotted on the abscissa and the main cylinder pressure pH plotted on the ordinate. According to the invention, instead of the vacuum brake booster 18 providing an additional flat characteristic curve, as soon as the point is reached at which mean braking deceleration is exceeded (i.e., beginning at the drift point V) the hydraulic amplification effect of the pump 1 results in a desirable continuation of a substantial booster effect in the main brake cylinder 19.

List of Reference Numbers 1 pump
2,3 wheel brake
4 casing
5 piston subassembly
6 differential piston
7 face
8 brake pressure applicator
9 face
10 pressure agent supply
11 valve closing element
12 pressure agent connection
13 block valve
14 brake pressure line
15 bypass path
16, 16' pressure modulation valve
17 2/2-port directional control valve
18 vacuum brake booster
19 main brake cylinder
20 supply tank
21 return line
22 low-pressure storage device
23 pump suction valve
24 pressure retention valve
25 reversing valve
26 muffling chamber
27 aperture
28 pressure limiting valve
29 check valve
30 readjusting spring
31 pressure switch
A, B characteristic curve
V drift point
Ff pedal force
pH main cylinder pressure

What is claimed is:
1. A hydraulic motor vehicle brake system with wheel slip controller, comprising:
   a brake pressure applicator, including a pedal-activated vacuum brake booster and a main brake cylinder wherein said brake pressure applicator is connected by way of a brake line to at least one pair of wheel brakes,
   a pump connected to the brake line for conveying pressure agent from the brake pressure applicator in the direction of the wheel brakes during wheel slip control,
   at least one pressure modulation valve installed in the brake line to vary the brake pressure in the wheel brakes during the wheel slip control process, wherein the vacuum brake booster amplifies the effect of the pedal force on the main brake cylinder during normal braking operation without wheel slippage, wherein a maximum vacuum brake force amplification is limited to a mean wheel braking pressure that represents normal braking without causing wheel slippage, and wherein when said mean value exceeds the vacuum brake force amplification, it is supplemented by said pump wherein said pump is configured to a level of pressure that is proportionate to pedal force, wherein the piston subassembly exhibits a differential piston having a large face subjected to the pressure of the brake force applicator and a small face connected to a first port which is subjected to both the pressure of the pump and the wheel braking pressure.

2. Hydraulic motor vehicle braking system according to claim 1, wherein the pedal force proportionate control of wheel braking pressure is adjusted by a piston subassembly which is installed in a casing in the braking system and is impinged upon by the pump.

3. Hydraulic motor vehicle braking system according to claim 1, further including a valve closing element provided in the casing between the small face and the first port.

4. Hydraulic motor vehicle braking system according to claim 2, wherein the piston subassembly is mounted in series connection in the brake line downstream from an electromagnetic block valve.

5. Hydraulic motor vehicle braking system according to claim 4, wherein the piston subassembly, which is arranged in a bypass path parallel to an electromagnetic block valve installed in the brake line provides, in its unexcited position, an unobstructed hydraulic connection between the brake force applicator and the pressure modulation valves positioned downstream from the wheel brakes.

6. Hydraulic motor vehicle braking system according to claim 5, further including a 2/2-port directional control valve arranged in parallel to the block valve is provided in the hydraulic connection between the pump and the piston subassembly.

7. Hydraulic motor vehicle braking system according to claim 6, wherein the 2/2-port directional control valve is designed as an electromagnetic valve set for unobstructed flow when it is in its unexcited position, and that it interrupts the pressure agent connection emanating from the pump in the direction of the piston subassembly in response to electric stimulation.

8. Hydraulic motor vehicle braking system according to claim 6, wherein the 2/2-port directional control valve is designed as an hydraulic valve which is closed in its basic position and can be set for unobstructed flow in response to pressure from the brake pressure applicator and, when in its excited position, allows the pressure agent from the pump to reach the piston subassembly.

9. A hydraulic motor vehicle brake system with wheel slip controller, comprising:

a brake pressure applicator, including a pedal-activated vacuum brake booster and a main brake cylinder wherein said brake pressure applicator is connected by way of a brake line to at least one pair of wheel brakes, a pump connected to the brake line for conveying pressure agent from the brake pressure applicator in the direction of the wheel brakes during wheel slip control, at least one pressure modulation valve installed in the brake line to vary the brake pressure in the wheel brakes during the wheel slip control process, wherein the vacuum brake booster amplifies the effect of the pedal force on the main brake cylinder during normal braking operation without wheel slippage, wherein a maximum vacuum brake force amplification is limited to a mean wheel braking pressure that represents normal braking without causing wheel slippage, and wherein when said mean value exceeds the vacuum brake force amplification, it is supplemented by said pump wherein said pump is configured to a level of pressure that is proportionate to pedal force, wherein the pedal force proportionate control of wheel braking pressure is adjusted by a piston subassembly which is installed in a casing in the braking system and is impinged upon by the pump, wherein the piston subassembly is mounted in series connection in the brake line downstream from an electromagnetic block valve, wherein the piston subassembly, which is arranged in a bypass path parallel to an electromagnetic block valve installed in the brake line provides, in its unexcited position, an unobstructed hydraulic connection between the brake force applicator and the pressure modulation valves positioned downstream from the wheel brakes.

10. Hydraulic motor vehicle braking system according to claim 9, wherein the piston subassembly exhibits a differential piston having a large face subjected to the pressure of the brake force applicator and a small face connected to a first port which is subjected to both the pressure of the pump and the wheel braking pressure.

11. Hydraulic motor vehicle braking system according to claim 10, further including a valve closing element provided in the casing between the small face and the first port.

12. Hydraulic motor vehicle braking system according to claim 10, further including a 2/2-port directional control valve arranged in parallel to the block valve is provided in the hydraulic connection between the pump and the piston subassembly.

13. Hydraulic motor vehicle braking system according to claim 12, wherein the 2/2-port directional control valve is designed as an electromagnetic valve set for unobstructed flow when it is in its unexcited position, and that it interrupts the pressure agent connection emanating from the pump in the direction of the piston subassembly in response to electric stimulation.

14. Hydraulic motor vehicle braking system according to claim 12, wherein the 2/2-port directional control valve is designed as an hydraulic valve which is closed in its basic position and can be set for unobstructed flow in response to pressure from the brake pressure applicator and, when in its excited position, allows the pressure agent from the pump to reach the piston subassembly.

\* \* \* \* \*